REPLICA PRODUCING SYSTEM UTILIZING RESOLVERS

Filed March 8, 1966 5 Sheets-Sheet 1

3,457,484

REPLICA PRODUCING SYSTEM UTILIZING RESOLVERS

Kanryo Shimizu and Tokiji Shimajiri, Tokyo, and Yoshihiro Hashimoto, Yokohama-shi, Japan, assignors to Fujitsu Limited, Kawasaki, Japan, a corporation of Japan Filed Mar. 8, 1966, Ser. No. 532,703
Claims priority, application Japan, Mar. 15, 1965, 40/15,157
Int. Cl. B23q *35/00, 35/14;* G05b *19/02*
U.S. Cl. 318—162 9 Claims

ABSTRACT OF THE DISCLOSURE

A replica producing system utilizes a tracing device comprising a housing. A tracing stylus has a spherical section mounted thereon at an intermediate area thereof and projecting beyond the surface of the stylus. The spherical section is seated in a spherical sectional seat formed in the housing for substantially universal movement. The spherical sectional seat is slidably mounted in the housing for movement in axial directions of the axis of the housing. Differential transformers abutting the stylus at different areas thereof produce electrical signals corresponding to the displacement of the stylus.

The present invention relates to a replica producing system. More particularly, the invention relates to a replica producing system utilizing resolvers.

The principal object of the present invention is to provide a new and improved replica producing system. The replica producing system of the present invention provides accurate and reliable replica production although it comprises simple apparatus. The replica producing system of the present invention, in one embodiment, produces a two-dimensional replica of a two-dimensional object, and in another embodiment, produces a three-dimensional replica of a three-dimensional object.

In accordance with the present invention, a replica producing system comprises a platform movably mounted for movement in two mutually perpendicular axial directions. Motors are coupled to the platform for moving the platform in the two axial directions at determined velocities. An object to be duplicated is positioned on the platform and moves therewith. A workpiece is positioned on the platform and moves therewith in spaced relation from the object. A tracing unit is mounted for movement in a third axial direction perpendicular to a plane formed by the two mutually perpendicular directions. The tracing unit is positioned in operative proximity with the object and produces electrical signals corresponding to displacement of the platform and therefore to displacement of the object in each of the two axial directions and the third axial direction. A cutter is positioned in operative proximity with the workpiece and is mounted for movement with the tracing unit in spaced relation therewith. A control unit having inputs connected to the tracing unit and outputs connected to the motors drives the motors in directions and at velocities which nullify the displacement of the platform. The control unit includes angular index servo and function generator means having resolvers coupled to the tracing unit for converting the electrical signals produced by the tracing unit to electrical signals corresponding to the velocity of the platform in the two axial directions. Pulse generators connected to a resolver in the control unit produce pulses having frequencies proportional to the electrical signals provided by the angular index servo and function generator means. Motor driving units are connected between the pulse generators and the motors for driving the motors at rotational velocities proportional to the frequency of the pulses.

In another embodiment of the invention, the platform is movably mounted for movement in three mutually perpendicular axial directions, the motors move the platform in the three axial directions at determined velocities, the tracing unit produces electrical signals corresponding to displacement of the object in each of the three axial directions, and the control unit includes a pulse generator connected to the tracing unit for producing pulses having frequencies proportional to the displacement of the object in the third axial direction.

In order that the present invention may be readily carried into effect, it will now be described with reference to the accompanying drawings, wherein.

Figure 1:
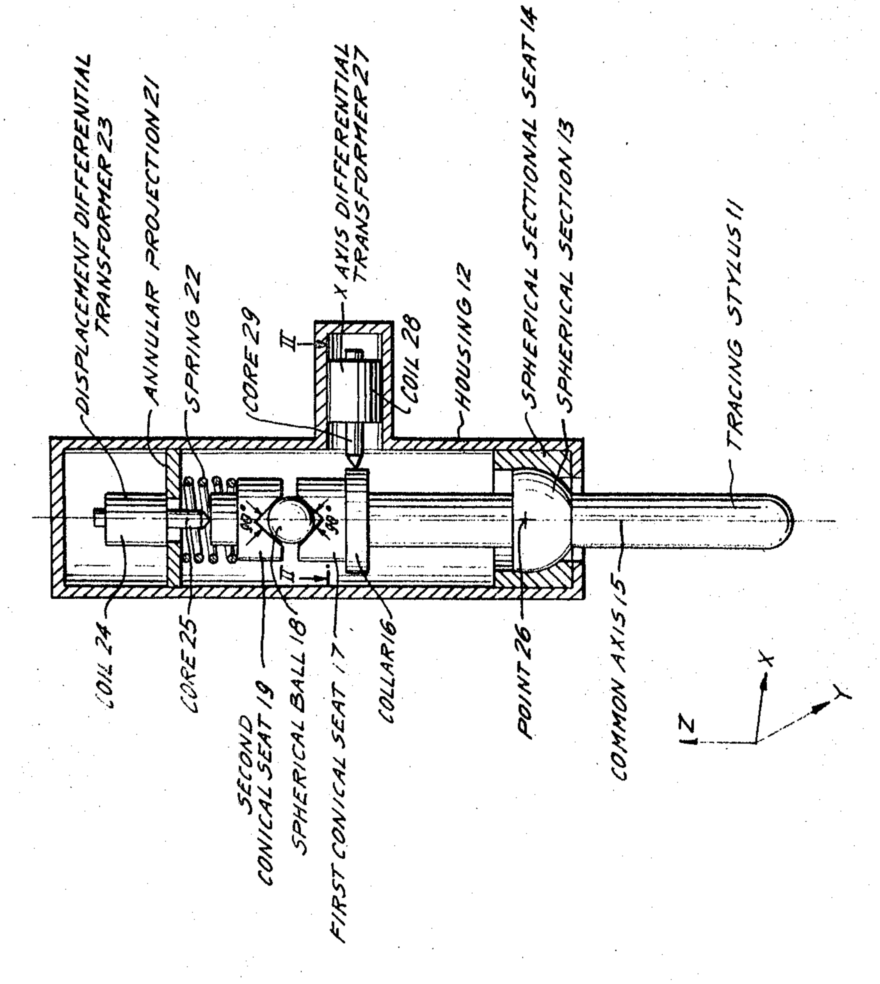
FIG. 1 is a view, partly in section, of an embodiment of a tracing head of the replica producing system of the present invention.

In FIG. 1, a tracing stylus 11 is mounted for universal motion in a housing 12. A spherical section 13 is provided on the stylus 11 at an intermediate area thereof and projects beyond the surface of said stylus. The spherical section 13 is seated in a spherical sectional seat 14 for substantially universal movement and said seat is slidably mounted in the housing 12 for movement in axial directions of the common axis 15.

A collar or lip 16 is provided on top of the stylus 11 and a first conical seat 17 is provided on the collar 16. A substantially spherical ball 18 is seated in the first conical seat 17 and a second conical seat 19 is placed in inverted position, relative to said first conical seat, on the ball 18. An annular lip or projection 21, which is integrally formed with or rigidly affixed to the housing 12, extends into said housing in the upper area thereof. A spring 22, which is preferably of helical configuration, abuts the lower surface of the projection 21 at its upper end and abuts the upper surface of the second conical seat 19 at its lower end, thereby exerting a downward force on the stylus 11.

A displacement differential transformer 23 comprises a coil or winding 24 coaxially mounted on the projection 21 of the housing 12 and an axially movable core 25 coaxially positioned in the coil 24.

The core 25 of the displacement differential transformer 23 abuts the upper surface of the second conical seat 19 at its lower end and moves with the stylus 11. The stylus 11 is universally movable about a point 26, due to its spherical mounting in the spherical sectional seat 14.

Movement of the tracing stylus 11 in any direction is indicated by the displacement differential transformer 23, which produces a voltage corresponding in magnitude to the difference between the actual displacement of the core 25, and thereby the stylus 11, in its axial or Z axis direction, and the standard displacement thereof. The actual displacement of the core 25, and thus stylus 11, in the X, Y and Z axis directions for $x$, $y$ and $z$ magnitudes, respectively, is (1) $$D=\sqrt{x^2+y^2+z}$$

where D is the actual displacement of the stylus 11 from its standard or reference position, $x$ is the magnitude of the displacement of the stylus in the X axis direction, $y$ is the magnitude of the displacement of the stylus in the Y axis direction and $z$ is the magnitude of the displacement of the stylus in the Z axis direction.

In the embodiment of FIG. 1, the standard or reference position of the tracing stylus 11 is attained by moving said stylus upward in the axial or Z axis direction by the standard or reference displacement magnitude D*s* from its initial or rest position. When the stylus 11 is at the standard displacement D*s* position, the output voltage of the displacement differential transformer 23 is zero. As the stylus 11 continues to move beyond the standard displacement D*s*, the output voltage of the displacement differential transformer 23 is proportional to D—D*s*, which is the difference between the actual displacement D of the stylus, as indicated by the actual displacement D of the core 25, in the Z axis direction, and the standard displacement D*s* of the stylus in the Z axis direction from the initial or rest position.

Figure 2:
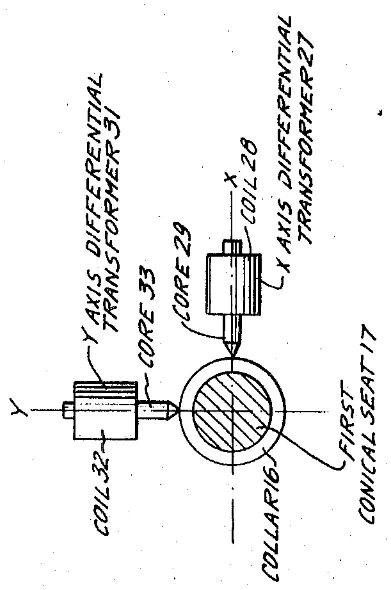
FIG. 2 is a view, partly in section, taken along the lines II—II of FIG. 1.

An X axis differential transformer 27 is positioned in the housing 12 radially relative to the collar 16. The X axis differential transformer 27 comprises a coil or winding 28 and an axially movable core 29 coaxially positioned in the coil 28 and coaxially positioned with a radial line of the collar 16 and abutting the peripheral surface of said collar. The core 29 of the X axis differential transformer 27 abuts the peripheral surface of the collar 16 at one end and moves with the stylus 11 when said stylus, and thus said collar, is moved in an X axis direction. A Y axis differential transformer 31 is positioned in the housing 12 radially relative to the collar 16 at an angle of 90 degrees from the X axis differential transformer 27 and independently therefrom, as shown in FIG. 2. The Y axis differential transformer 31 comprises a coil or winding 32 and an axially movable core 33 coaxially positioned in the coil 32 and coaxially positioned with a radial line of the collar 16 and abutting the peripheral surface of said collar. The core 33 of the Y axis differential transformer 31 abuts the peripheral surface of the collar 16 at one end and moves with the stylus 11 when said stylus, and thus said collar, is moved in a Y axis direction.

Figure 3:
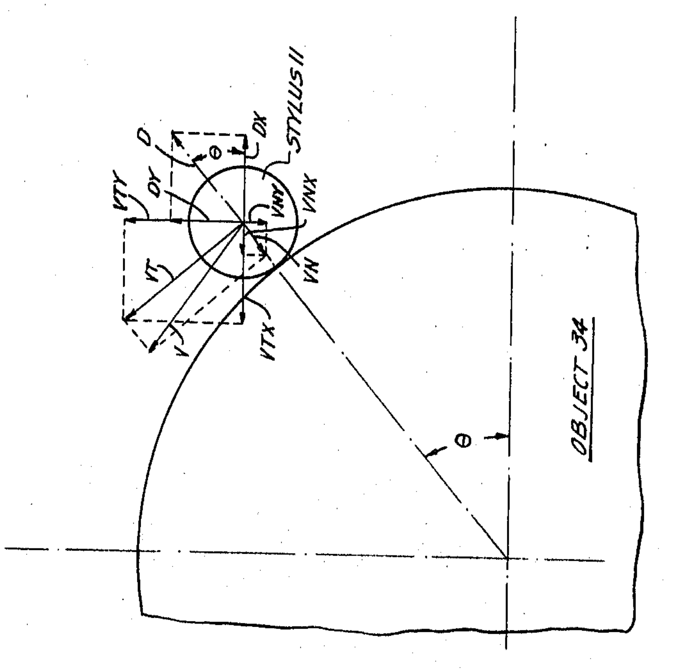
FIG. 3 is a schematic presentation of the velocity relation between the object to be reproduced and the tracing stylus.

FIG. 3 illustrates the velocity relation between the object to be reproduced and the tracing stylus. The object 34 to be reproduced is partially indicated. The tracing stylus 11 contacts the object 34 at a constant tangential velocity VT. If the object 34 is moved in a positive direction from its position shown in FIG. 3, it is displaced perpendicularly or normally from the point of contact of said object with the stylus 11, at an angle $\theta$ with the positive X axis direction. Therefore, in order that a replica may be produced, the stylus 11 must be kept in contact with the object 34, so that it is necessary that the object be moved at a velocity VN in such perpendicular or normal direction. The normal velocity VN of the object 34 is proportional in magnitude to D—D*s* and is in a direction opposite to the displacement D and the displacement D*s* of the stylus 11, as discussed with referfence to FIG. 1. The production of a replica may thus be accomplished at a desired tangential velocity by moving the object 34 at a velocity V which is the sum of the tangential velocity VT and the normal velocity VN.

Figures 4, 5, 6:
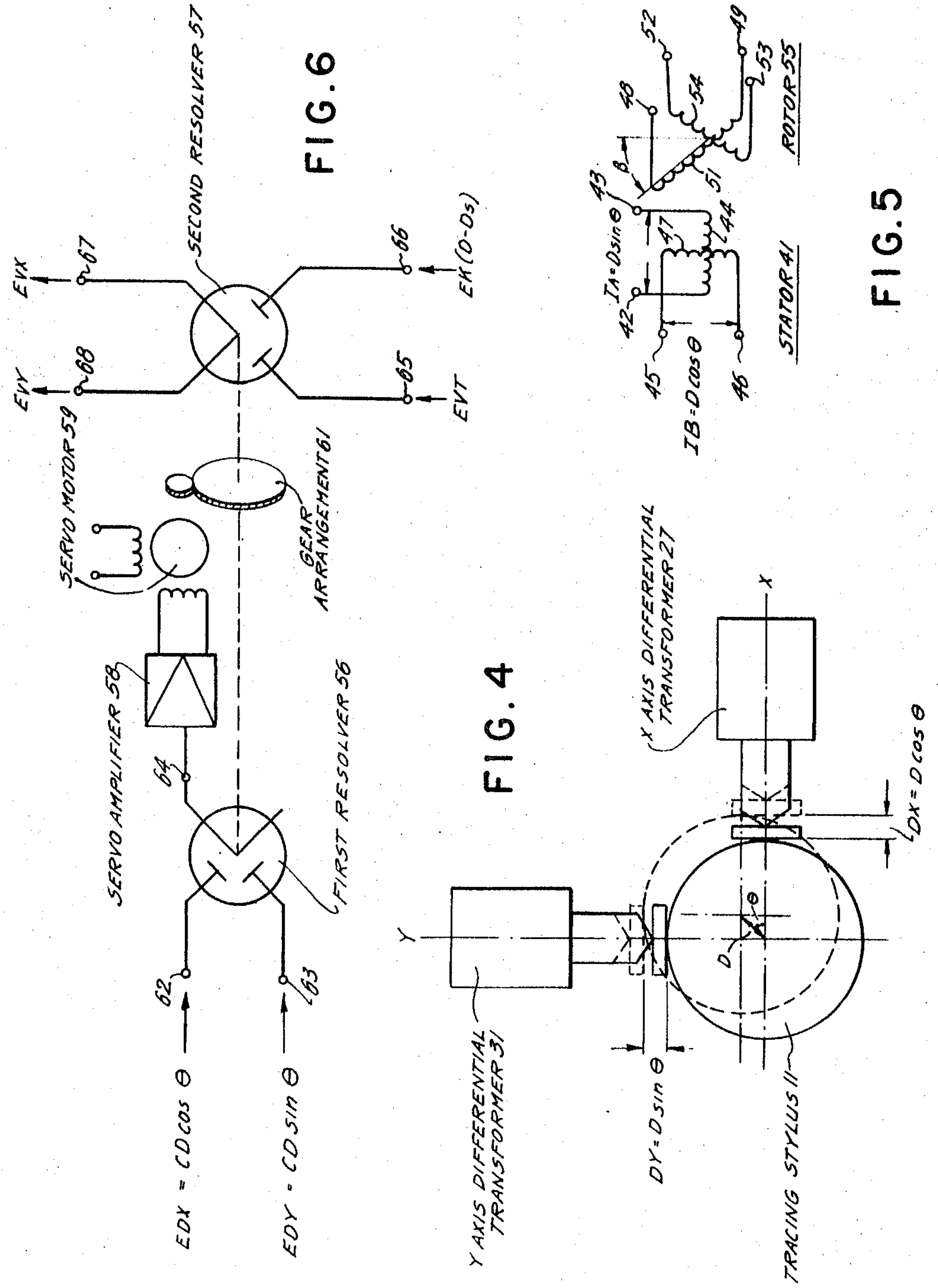
FIG. 4 is a modification of FIG. 2 on an enlarged scale illustrating a displacement of the tracing stylus.
FIG. 5 is a schematic circuit diagram illustrating the principle of operation of a resolver.
FIG. 6 is a block diagram of an embodiment of an angular index servo and function generator which is utilized in the replica producing system of the present invention.

When the stylus 11 is displaced a distance D from its initial position, as shown in FIG. 4, in the XY plane, the X axis component DX and Y axis is component DY of the displacement D are defined as:

(2) $$DX=D\cos\theta$$
and
(3) $$DY=D\sin\theta$$

The output voltage produced by the X axis differential transformer 27 is thus proportional to $\cos\theta$ and the output voltage produced by the Y axis differential transformer 31 is thus proportional to $\sin\theta$.

In order that the replica be produced at a constant tangential velocity TV with the stylus 11 maintained in contact with the object 34, said stylus must be moved at the velocity VN in the direction opposite to the displacement D and the displacement D*s*.

When the tracing stylus 11 is in contact with the object 34 in the replica production process or operation, the X axis component VX of the velocity V of the platform which supports said object and the Y axis component VY of said velocity are defined as:

(4) $$VX=VTX+VNX$$
and
(5) $$VY=VTY-VNY$$

where VT is the tangential velocity, which is constant, VTX is the X axis component of VT, VTY is the Y axis component of VT, VN is the normal or perpendicular velocity in a direction opposite that of the displacement D of the stylus 11, VNX is the X axis component of VN, VN*y* is the Y axis component of VN, and V is the composite velocity which is the sum of the tangential velocity VT and the normal velocity VN.

As shown in FIG. 3, the angle between the tangential velocity VT and the Y axis component VTY of VT is $\theta$, because the angle between the Y axis component DY of the displacement D, which is coincident with the Y axis component VTY of VT, and the X axis component DX of the displacement D is 90 degrees, so that the angle between the Y axis component DY and the displacement D is $90-\theta$ degrees and the angle between the tangential velocity VT and the displacement D is 90 degrees therefore leaving an angle of $\theta$ degrees between the tangential velocity VT and the Y axis component VTY of said tangential velocity. Thus, (6) $$VTX=VT\sin\theta$$
and
(7) $$VTY=VT\cos\theta$$

Furthermore, since VN is proportional in magnitude to $D-Ds$, $VN=K(D-Ds)$, and since the angle between the X axis component VNX of VN and VN is $\theta$ degrees, (8) $$VNX=K(D-Ds)\cos\theta$$
and
(9) $$VNY=K(D-Ds)\sin\theta$$

K being a constant having a negative magnitude.

Thus, Equations 4 and 5 become

(10) $$VX=VT\sin\theta+K(D-Ds)\cos\theta$$
and
(11) $$VY=VT\cos\theta-K(D-Ds)\sin\theta$$

The X axis component VX and Y axis component VY of the velocity V of the platform which supports the object 34 are thus determined from Equations 10 and 11, and a pulse motor which moves said platform in the X axis direction is energized by said X axis component and a pulse motor which moves said platform in the Y axis direction is energized by said Y axis component. In accordance with the present invention, Equations 10 and 11 are calculated by resolvers.

FIG. 5 illustrates the principle of operation of a resolver. In FIG. 5, an AC voltage input is applied to the stator 41 and comprises two currents.

(12) $IA=D \sin \theta$ and

(13) $IB=D \cos \theta$

The current IA is supplied to input terminals 42 and 43 of a first stator winding 44 and the current IB is supplied to input terminals 45 and 46 of a second stator winding 47. The rotor windings are offset $\beta$ degrees from the stator winding. The output voltage EA produced at output terminals 48 and 49 of a first rotor windings 51 is then

(14) $EA=D \sin \theta \sin \beta + D \cos \theta \cos \beta = D \cos (\theta - \beta)$ The output voltage EB produced at output terminals 52 and 53 of a second rotor winding 54 of the rotor 55 is then

(15) $EB=D \sin \theta \cos \beta - D \cos \theta \sin \beta = D \sin (\theta - \beta)$ The rotor 55 must thus be rotated through an angle $\theta$ before its output voltage will be constant at zero.

The foregoing principle of resolver operation is utilized in the replica producing system of the present invention which comprises an angular index servo and function generator, as shown in FIG. 6, including two resolvers 56 and 57, a servo amplifier 58, a servo motor 59 and a gear arrangement 61. The angular index servo and functions generator function to generate voltages corresponding to the X and Y axis components VX and VY of the velocity V of the platform as defined in Equations 10 and 11.

A voltage EDX corresponding to the X axis component DX of the displacement D, as defined in Equation 2, and thus equal to $CD \cos \theta$, where C is a constant, is produced as an output voltage by the X axis differential transformer 27 (FIG. 4) and is applied to one stator winding of the first resolver 56 via an input terminal 62. A voltage EDY corresponding to the Y axis component DY of the displacement D, as defined in Equation 3, and thus equal to $CD \sin \theta$, is produced as an output voltage by the Y axis differential transformer 31 (FIG. 4) and is applied to the other stator winding of the first resolver 56 via an input terminal 63.

The output voltage of the rotor of the first resolver 56 is applied via an output terminal 64 to the servo amplifier 58 which amplifies it and applies it to the servo motor 59. The servo motor 59 rotates the rotor of the second resolver 57 via the gear arrangement 61 until the output voltage at the output terminal 64 of the rotor of the first resolver 56 is constant at zero. If the angles of rotation of the rotors of the first and second resolvers 56 and 57 are the same, the rotor of the second resolver may be rotated through an angle $\theta$.

A voltage EVT corresponding to the tangential velocity VT is applied to one stator winding of the second resolver 57 via an input terminal 65. A voltage $EK(D-Ds)$ corresponding to the output voltage of the displacement differential transformer 23 (FIG. 1) is applied to the other stator winding of the second resolver 57 via an input terminal 66. When the rotor of the second resolver 57 has been rotated through an angle $\theta$, due to the afore-described operation of the angular index servo and function generator, one of the rotor windings of said second resolver produces at an output terminal 67 an output voltage EVX corresponding to the X axis component VX of the velocity V of the platform, which is defined in Equation 10, and the other of said rotor windings produces at an output terminal 68 an output voltage EVY corresponding to the Y axis component VY of the velocity V of the platform, which is defined in Equation 11.

Figure 7:
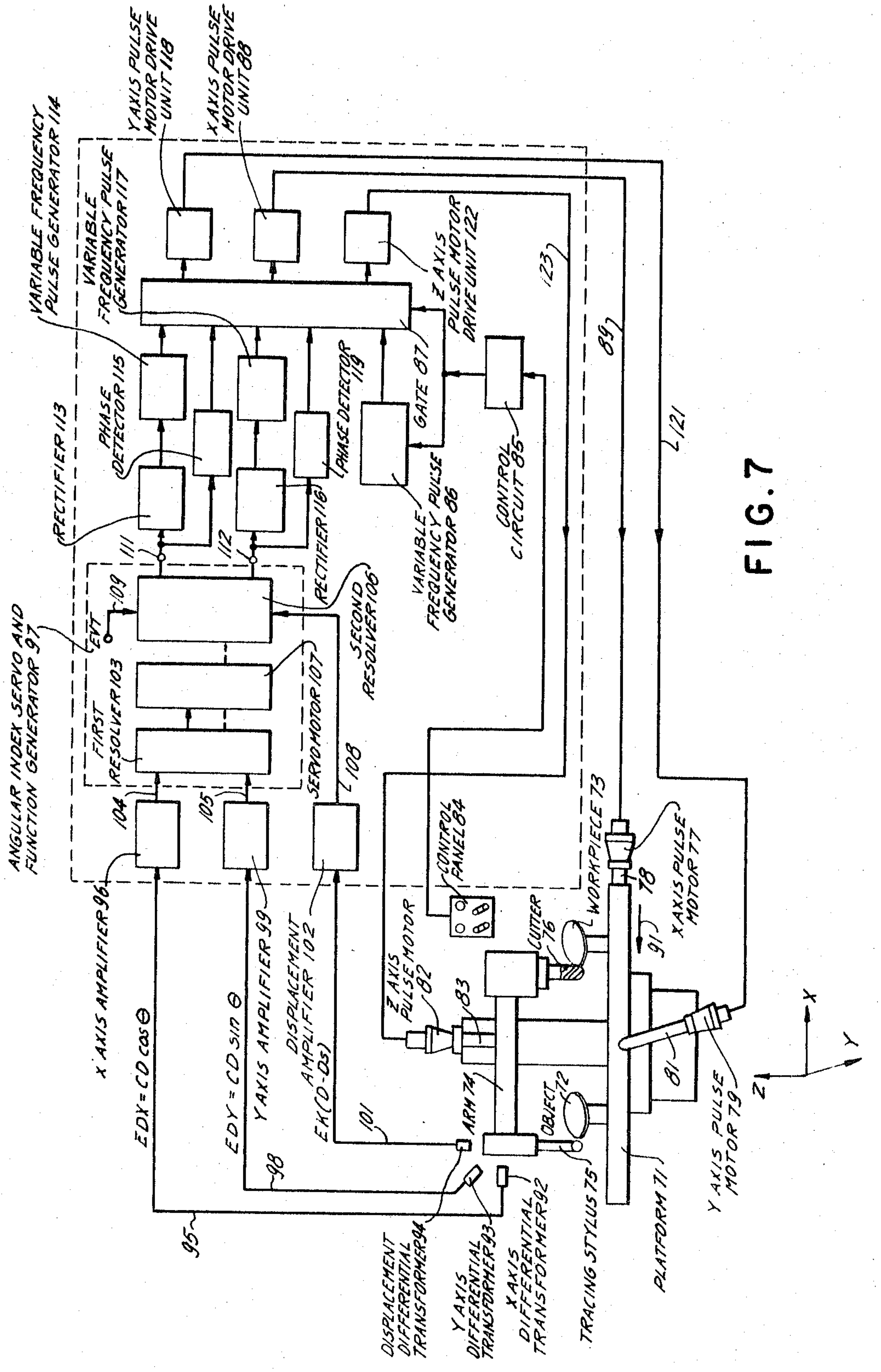
FIG. 7 is a block diagram of an embodiment of the replica producing system of the present invention.

FIG. 7 illustrates a replica producing system of the present invention. In FIG. 7, a milling machine, not shown, comprises a platform 71 which supports an object 72 to be reproduced and a workpiece 73 from which a replica of the object 72 is to be produced. An arm 74 supports a tracing stylus 75 at one end and a cutter 76 at the other end. The platform 71 is movable in X axis directions by an X axis pulse motor 77 coupled to said platform by suitable known coupling means 78. The platform 71 is movable in Y axis directions by a Y axis pulse motor 79 coupled to said platform by suitable known coupling means 81. The arm 74 is movable in Z axis directions by a Z axis pulse motor 82 coupled to said arm by suitable known coupling means 83. The tracing stylus 75 and the cutter 76 move with the arm 74.

In the embodiment of FIG. 7, the object 72 is traced through 360 degrees in the XY plane. A control panel 84 energizes a control circuit 85. The control circuit 85 operates to energize a variable frequency pulse generator 86 and to control the operation of a gate 87, which when in conductive condition transfers the pulses produced by said pulse generator 86 to an X axis pulse motor drive unit 88 to operate the X axis pulse motor 77 via a lead 89 and when in nonconductive condition blocks the pulses produced by said pulse generator 86 from said X axis pulse motor drive unit. The X axis pulse motor drive unit 88 is so energized by the pulse generator 86 that it rotates the X axis pulse motor 77 in a direction in which the platform 71 is moved in the negative X axis direction, as shown by an arrow 91. The object 72 is thus moved into abutment with the tracing stylus 75 and said tracing stylus is moved or displaced in the XY plane.

The displacement of the tracing stylus 75 in the XY plane is determined in its X axis component DX by an X axis differential transformer 92, which functions in the same manner as the X axis differential transformer 27 of FIGS. 1, 2 and 4 to produce an output voltage EDX corresponding to said X axis component. The displacement of the tracing stylus 75 in the XY plane is determined in its Y axis component DY by an Y axis differential transformer 93, which functions in the same manner as the Y axis differential transformer 31 of FIGS. 2 and 4 to produce an output voltage EDY corresponding to said Y axis component. The displacement of the tracing stylus 75 in the XY plane is determined in its displacement direction by a displacement differential transformer 94, which functions in the same manner as the displacement differential transformer 23 of FIG. 1 to produce an output voltage $EK(D-Ds)$ corresponding to the difference between the actual displacement D of said stylus and the standard displacement $Ds$ thereof.

The output voltage EDX produced by the X axis differential transformer 92 is applied via a lead 95 to an X axis amplifier 96, and the amplified voltage EDX which is, based on Equation 2, $CD \cos \theta$, is applied to the angular index servo and function generator 97. The output voltage EDY produced by the Y axis differential transformer 93 is applied via a lead 98 to a Y axis amplifier 99, and the amplified voltage EDY which is based on Equation 3, $CD \sin \theta$, is applied to the angular index servo and function generator 97. The output voltage $EK(D-Ds)$ produced by the displacement differential transformer 94 is applied via a lead 101 to a displacement amplifier 102, and the amplified voltage $EK(D-Ds)$ is applied to the angular index servo and function generator 97.

The angular index servo and function generator 97 is similar to that shown in FIG. 6 and functions in a similar manner. The amplified voltage $EDX=CD \cos \theta$ is applied to one stator winding of a first resolver 103 via a lead 104 and the amplified voltage $EDY=CD \sin \theta$ is applied to the other stator winding of said first resolver via a lead 105. The rotor of the first resolver 103 is mechanically coupled to the rotor of a second resolver 106 via a servo motor 107. The amplified voltage $EK(D-Ds)$ is applied to one stator winding of the second resolver 106 via a lead 108 and a voltage EVT corresponding to the predetermined tangential velocity is applied to the other stator winding of said second resolver via a lead 109. The second resolver 106 produces at an output terminal 111 of one of its rotor windings an output voltage EVX, as defined in Equation 10, and produces at an output terminal 112 of the other of its rotor windings an output voltage EVY, as defined in Equation 11.

The voltage EVX, corresponding to the X axis component VX of the velocity V of the platform 71, is rectified by a rectifier 113 and the output voltage of said rectifier energizes a variable frequency pulse generator 114 which produces pulses having a frequency proportional to the voltage EVX. The pulses produced by the pulse generator 114 are supplied to the X axis pulse motor drive unit 88 via the gate 87. The gate 87 is controlled in operation by a phase detector 115 which is connected between the output terminal 111 of the angular index servo and function generator 97 and said gate. When the gate 87 is in conductive condition, it transfers the pulses produced by the pulse generator 114 to the X axis pulse motor drive unit 88 to operate the X axis pulse motor 77 and when it is in non-conductive condition it blocks the pulses produced by said pulse generator 114. The X axis pulse motor drive unit 88 is so energized by the pulse generator 114 that it rotates the X axis pulse motor 77 in a direction in which the platform 71 is moved in an X axis direction which negates the displacement $D—Ds$ of the stylus 75.

The voltage EVY, corresponding to the Y axis component VY of the velocity V of the platform 71, is rectified by a rectifier 116 and the output voltage of said rectifier energizes a variable frequency pulse generator 117 which produces pulses having a frequency proportional to the voltage EVY. The pulses produced by the pulse generator 117 are supplied to a Y axis pulse motor drive unit 118 via the gate 87. The gate 87 is controlled in operation by a phase detector 119 which is connected between the output terminal 112 of the angular index servo and function generator 97 and said gate. When the gate 87 is in conductive condition, it transfers the pulses produced by the pulse generator 117 to the Y axis pulse motor drive unit 118 and when it is in non-conductive condition it blocks the pulses produced by said pulse generator 117. The Y axis pulse motor drive unit 118 is so energized by the pulse generator 117 that it rotates the Y axis pulse motor 79 in a direction in which the platform 71 is moved in a Y axis direction which negates the displacement $D—Ds$ of the stylus 75.

The control panel 84 is also utilized to energize the control circuit 85 to energize the variable frequency pulse generator 86 and to control the operation of the gate 87 so that when said gate is in conductive condition it transfers the pulses produced by said pulse generator 86 to the Y axis pulse motor drive unit 118 to operate the Y axis pulse motor 79 via a lead 121 and when it is in non-conductive condition it blocks the pulses produced by said pulse generator 86 from said Y axis pulse motor drive unit. The Y axis pulse motor drive unit 118 is so energized by the pulse generator 86 that it rotates the Y axis pulse motor 79 in a direction in which the platform 71 is moved in the negative Y axis direction, extending outward from and perpendicular to the plane of the sheet of the drawing.

A Z axis pulse motor drive unit 122 is connected between the gate 87 and the Z axis pulse motor 82 via a lead 123 in FIG. 7, but is not utilized in the system of FIG. 7 because it is a two dimensional system.

Figure 8:
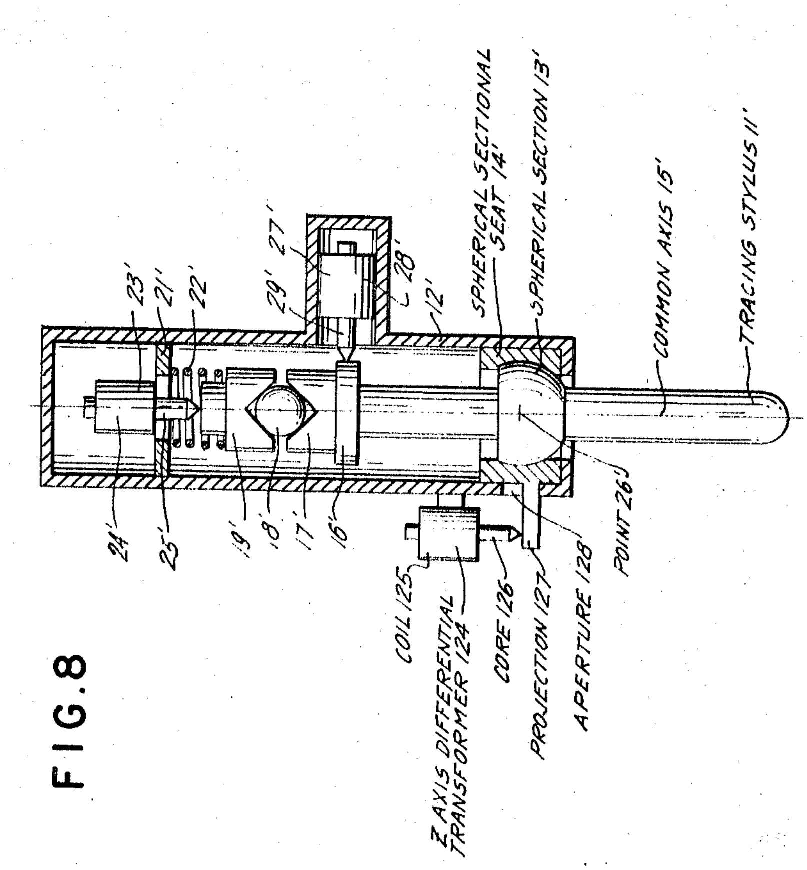
FIG. 8 is a view, partly in section, of a modification of the tracing head of FIG. 1.

The tracing head of FIG. 8 is similar to the tracing head of FIG. 1 with the exception that the tracing head of FIG. 8 includes a Z axis differential transformer 124. The Z axis differential transformer 124 is positioned in operative proximity with the spherical sectional seat 14' either inside or outside the housing 12'. The Z axis differential transformer 124 comprises a coil or winding 125 and an axially movable core 126 coaxially positioned in the coil 125 and positioned parallel with the common axis 15'. The core 126 of the Z axis differential transformer 124 abuts an extending projection 127 of the spherical sectional seat 14' which extends out of the housing 14' via an aperture, slot or window 128 and which moves with said spherical sectional seat. The core 126 abuts the upper surface of the projection 127 at one end and moves with the stylus 11' when said stylus, and thus the seat 14' and said projection, is moved in a Z axis direction.

The Z axis differential transformer 124 determines the Z axis component DZ of the displacement of the tracing stylus 11' so that a replica of a three dimensional object may be produced in three dimensions. When the tracing stylus 11' is displaced in a Z axis direction as well as in an XY plane, it provides an actual displacement, as indicated in Equation 1, which is indicated by the displacement differential transformer 23' by an output voltage corresponding to said actual displacement. In a three dimensional replica production system, the magnitude $z$ of the displacement of the stylus in the Z axis direction must be made zero in Equation 1 by movement of the stylus in the Z axis direction, and the movement of the stylus in the Z axis direction as well as in the X and Y axis directions must be controlled.

The Z axis differential transformer 124 is preadjusted so that it produces an output voltage corresponding to the difference $(Dz-DZs)$ between the actual Z axis component DZ of the displacement D of the stylus from its standard or reference position and the standard or reference displacement magnitude D$Zs$ in the Z axis direction. The predetermined standard displacement D$Zs$ in the Z axis direction is selected as a small magnitude. If additional components are added to the replica producing system of FIG. 7, said system becomes a three dimensional system and the Z axis pulse motor 82 is rotated in a manner in which the platform 71 is moved in a Z axis direction which negates the displacement $DZ-DZs$ of the stylus 75 (FIG. 7).

In a three dimensional system, the displacement differential transformer 23' indicates the actual displacement $$D=\sqrt{x^2+y^2}+zs \tag{16}$$

where D, $x$ and $y$ are the same as in Equation 1 and $zs$ is the magnitude of the standard or reference displacement D$Zs$ of the stylus in the Z axis direction.

In a two dimensional system, the replica producing operation is subjected to the conditions imposed by Equations 10 and 11 which are:

$$VX=VT\sin\theta+K(D-Ds)\cos\theta \tag{10}$$

and $$VY=VT\cos\theta-K(D-Ds)\sin\theta \tag{11}$$

Equations 10 and 11 may be rewritten by replacing $\sin\theta$ with its algebraic coordinates $y/\sqrt{x^2+y^2}$ and by replacing $\cos\theta$ with its algebraic coordinates $x/\sqrt{x^2+y^2}$. Thus, $\tan\theta=y/x$ and $$VX=VT\frac{y}{\sqrt{x^2+y^2}}+K(D-Ds)\frac{x}{\sqrt{x^2+y^2}} \tag{17}$$

and $$VY=VT\frac{x}{\sqrt{x_2+y^2}}-K(D-Ds)\frac{y}{\sqrt{x^2+y^2}} \tag{18}$$

In a three dimensional system, $\sqrt{x^2+y^2}$ is replaced by $\sqrt{x^2+y^2}+zs$. If $zs$ is made sufficiently small, the requirements for three dimensional reproduction are satisfied by the requirements for two dimensional reproduction.

Figure 9:
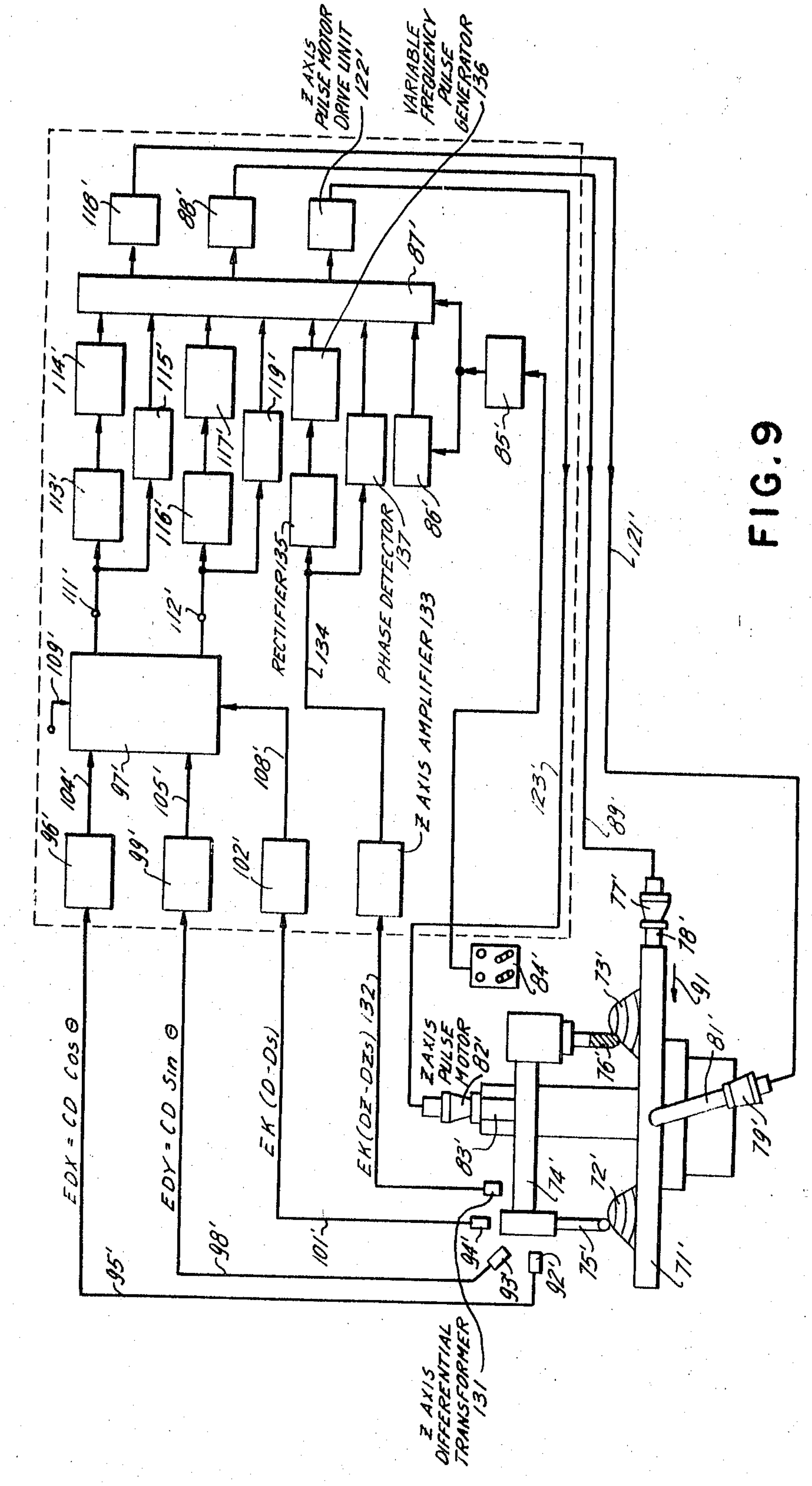
FIG. 9 is a block diagram of a modification of the replica producing system of FIG. 7.

FIG. 9 is the replica production system of FIG. 7 modified to function as a three dimensional system. FIG. 9 is the same as FIG. 7, except for a few additional components. The displacement of the tracing stylus 75' in the Z axis direction is determined in its Z axis component DZ by a Z axis differential transformer 131, which functions in a manner similar to the displacement differential transformer 23 of FIG. 1 to produce an output voltage $EK(DZ-DZs)$ corresponding to the difference between the actual Z axis component DZ of the displacement D of the stylus and the standard displacement magnitude $DZs$ in the Z axis direction.

The output voltage $EK(DZ-DZs)$ produced by the Z axis differential transformer 131 is applied via a lead 132 to a Z axis amplifier 133, and the amplified voltage $EK(DZ-DZs)$ is applied via a lead 134 to a rectifier 135. The output voltage of the rectifier 135 energizes a variable frequency pulse generator 136 which produces pulses proportional to the voltage $EK(DZ-DZs)$. The pulses produced by the pulse generator 136 are supplied to the Z axis pulse motor drive unit 122' via the gate 87'. The gate 87' is controlled in operation, by a phase detector 137 which is connected between the Z axis amplifier 133 and said gate. When the gate 87' is in conductive condition, it transfers pulses produced by the pulse generator 136 to the Z axis pulse motor drive unit 122' to operate the Z axis pulse motor 82' and when it is non-conductive it blocks the pulses produced by said pulse generator 136. The Z axis pulse motor drive unit 122' is so energized by the pulse generator 136 that it rotates the Z axis pulse motor 82' in a direction in which the platform 71' is moved in a Z axis direction which negates the Z axis displacement $DZ-DZs$ of the stylus 75'.

It is thus seen that the X axis and Y axis components VX and VY, respectively, of the velocity of the platform which supports the object to be duplicated are determined by an angular index servo and function generator of simple structure. The X and Y axis pulse motors are driven at the required velocity by the corresponding variable frequency pulse generators, so that the replica producing system of the present invention provides accurate and reliable two dimensional replica production with a simple structure and with facility. The replica production covers a full 360° scope.

The pulse motors 77, 79 and 82 comprise any suitable motors which rotate through an angle corresponding to the number of pulses supplied to the motor; the speed of rotation of the motor being proportional to the frequency of the supply pulses. A suitable motor for such use is an electrohydraulic pulse motor, which comprises a step motor and a feedback type hydraulic motor.

While the invention has been described by means of specific examples and in specific embodiments, we do not wish to be limited thereto, for obvious modifications will occur to those skilled in the art without departing from the spirit and scope of the invention.

What is claimed is:

1. A replica producing system, comprising:

a platform movably mounted for movement in two mutually perpendicular axial directions;

motor means coupled to said platform for moving said platform in said two axial directions at determined velocities;

an object to be duplicated positioned on said platform and moving therewith;

a workpiece positioned on said platform and moving therewith in spaced relation from said object;

tracing means mounted for movement in a third axial direction perpendicular to a plane formed by said two mutually perpendicular directions, said tracing means being positioned in operative proximity with said object and producing electrical signals corresponding to displacement of said platform and theremeans being positioned in operative proximity with fore to displacement of said object in each of said two axial directions and said third axial direction, said tracing means comprising a housing having an axis and a spherical sectional seat formed therein, a tracing stylus, a spherical section mounted on said tracing stylus at an intermediate area thereof and projecting beyond the surface of said tracing stylus and seated in said spherical sectional seat for substantially universal movement, said spherical sectional seat being slidably mounted in said housing for movement in axial directions of said axis, and differential transformer means abutting said stylus at different areas thereof for producing electrical signals corresponding to displacement of said stylus;

cutting means positioned in operative proximity with said workpiece and mounted for movement with said tracing means in spaced relation therewith; and control means having input means connected to said tracing means and output means connected to said motor means for driving said motor means in directions and at velocities which nullify the displacement of the stylus of said tracing means, said control means including angular index servo and function generator means having resolver means coupled to said tracing means for converting the electrical signals produced by said tracing means to electrical signals corresponding to the velocity of said platform in said two axial directions.

2. A replica producing system as claimed in claim 1, wherein said control means includes pulse generator means connected to said resolver means for producing pulses having frequencies proportional to the electrical signals provided by said angular index servo and function generator means.

3. A replica producing system as claimed in claim 2, wherein said control means includes motor driving means connected between said pulse generator means and said motor means for driving said motor means at rotational velocities proportional to the frequency of said pulses.

4. A replica producing system as claimed in claim 1, wherein said differential transformer means comprises an X axis differential transformer abutting said stylus at one area therof for producing electrical signals corresponding to the X axis components of displacement of said stylus, a Y axis differential transformer abutting said stylus at another area thereof for producing electrical signals corresponding to the Y axis components of displacement of said stylus and a displacement differential transformer abutting said stylus at a third area thereof for producing electrical signals corresponding to the actual displacement of said stylus.

5. A replica producing system as claimed in claim 1, wherein said platform is movably mounted for movement in three mutually perpendicular axial directions, said motor means moves said platform in said three axial directions at determined velocities and said tracing means produces electrical signals corresponding to displacement of said object in each of said three axial directions, and wherein said control means includes pulse generator means connected to said tracing means for producing pulses having frequencies proportional to the displacement of said object in the third axial direction.

6. A replica producing system as claimed in claim 5, wherein said control means includes pulse generator means connected to said resolver means for producing pulses having frequencies proportional to the electrical signals provided by said angular index servo and function generator means and motor driving means connected between said pulse generator means and said motor means for driving said motor means at rotational velocities proportional to the frequency of said pulses.

7. A replica producing system as claimed in claim 1, wherein said differential transformer means comprises an X axis differential transformer abutting said stylus at one area thereof for producing electrical signals corresponding to the X axis components of displacement of said stylus, a Y axis differential transformer abutting said stylus at another area thereof for producing electrical signals corresponding to the Y axis components of displacement of said stylus, a Z axis differential transformer coupled to said stylus at a third area thereof for producing electrical signals corresponding to the Z axis components of displacement of said stylus and a displacement differential transformer abutting said stylus at a fourth area thereof for producing electrical signals corresponding to the actual displacement of said stylus.

8. A replica producing system as claimed in claim 1, wherein said tracing means further comprises a collar on said stylus in said housing having a first conical seat mounted thereon, a substantially spherical ball seated in said first conical seat, a second conical seat on said ball in inverted position relative to said first conical seat, an annular lip in and extending into said housing, and a spring abutting the lower surface of said lip at its upper end and abutting the upper surface of said second conical seat at its lower end thereby exerting a downward force on said stylus.

9. A replica producing system as claimed in claim 8, wherein said differential transformer means comprises an X axis differential transformer abutting said stylus at one area thereof for producing electrical signals corresponding to the X axis components of displacement of said stylus, a Y axis differential transformer abutting said stylus at another area thereof for producing electrical signals corresponding to the Y axis components of displacement of said stylus, a Z axis differential transformer coupled to said stylus at a third area thereof for producing electrical signals corresponding to the Z axis components of displacement of said stylus and a displacement differential transformer abutting said stylus at a fourth area thereof for producing electrical signals corresponding to the actual displacement of said stylus.

References Cited

UNITED STATES PATENTS

| | | | |
|---|---|---|---|
| 2,410,295 | 10/1946 | Kuehni et al. | |
| 2,413,274 | 12/1946 | Wilkie et al. | |
| 2,511,956 | 6/1950 | Wetzel. | |
| 2,559,575 | 7/1951 | Fryklund et al. | |
| 2,983,858 | 5/1961 | Herndon. | |
| 3,062,996 | 11/1962 | Ertell et al. | 318—162 |
| 3,189,805 | 6/1965 | Poepsel et al. | |

ORIS L. RADER, Primary Examiner

G. R. SIMMONS, Assistant Examiner

U.S. Cl. X.R.

318—28